June 6, 1950  A. PRICE ET AL  2,510,655

MOUSETRAP

Filed Feb. 2, 1948

INVENTORS.
Albert Price
BY Merle K. Benson

Attorney.

Patented June 6, 1950

2,510,655

UNITED STATES PATENT OFFICE 2,510,655

MOUSETRAP

Albert Price and Merle K. Benson,
Benton Harbor, Mich.

Application February 2, 1948, Serial No. 5,773

14 Claims. (Cl. 43—85)

1

This invention relates to improvements in mouse trap.

The principal objects of this invention are:

First, to provide a mouse trap which is sanitary in operation in that the trap may be baited and set without touching any of the parts which normally come in contact with the mouse.

Second, to provide a mouse trap in which the bait is inaccessible to household pets.

Third, to provide a mouse trap of pleasing appearance which can be economically manufactured of permanent material such as stamped metal or molded plastic.

Fourth, to provide a mouse trap in which the bait is inaccessible to the mouse so that the mouse cannot steal the bait without springing the trap.

Fifth, to provide a mouse trap having the foregoing advantages which has a positive killing action in trapping a mouse.

Sixth, to provide a mouse trap which has an automatic self-setting catch so as not to snap or injure the fingers of persons setting the trap.

Other objects and advantages pertaining to details and economies of our trap will be apparent from a consideration of the following description and claims. The drawings, of which there is one sheet, illustrate a preferred form of our trap.

Figure 2:
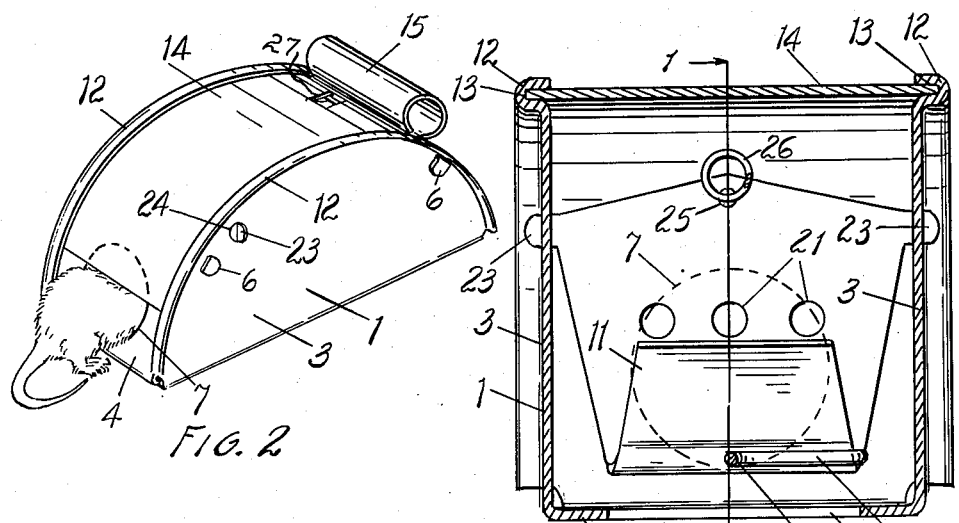
Fig. 2 is a perspective view of the trap with a mouse trapped therein.
Figure 3:
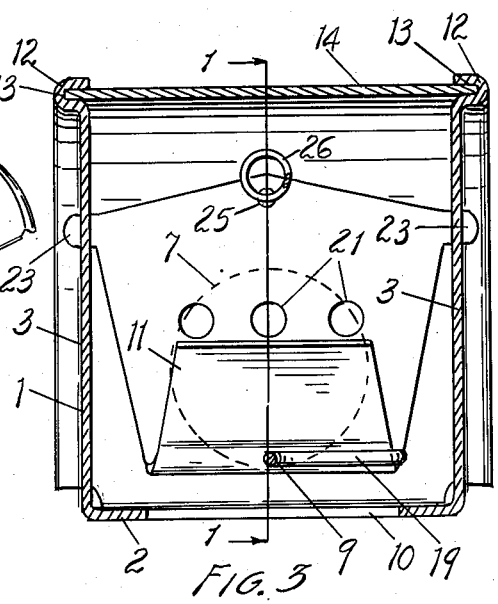
Fig. 3 is a transverse vertical cross sectional view along the line 3—3 in Fig. 1.
Figure 4:
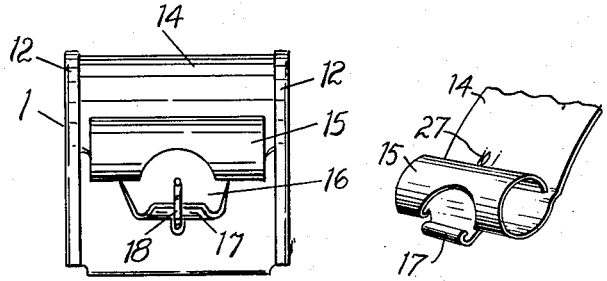
Fig. 4 is a rear elevational view of the trap showing the latch mechanism in latched position.
Figure 5:
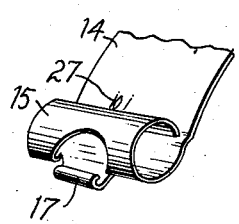
Figure 5 is a fragmentary perspective view of the rear end of the gate member of the trap.

The trap consists of a body member 1 formed as a sheet metal stamping and shaped to provide a flat base 2 and parallel arcuate side walls 3. Short end walls 4 and 5 are turned upwardly from the ends of the base 2 and formed into semi-cylindrical shape within the side walls 3. The end walls are provided with integral ears 6 which are projected through appropriately aligned slots in the side walls and bent over as shown in Fig. 2 to retain the side and end walls of the body member together.

The front end wall 4 defines an entrance aperture 7 through which the mice enter the trap and the rear end wall 5 defines a small aperture 8 through which the trigger bar 9 extends. The base 2 defines an aperture 10 through which access may be had to the bait hook 11 for baiting the trap.

The arcuate edges of the side walls 3 are provided with a reverse bend flange 12 which defines semi-cylindrical channels 13 completely along the top edges of the side walls and outside of the end walls 4 and 5. The channels 13 serve as rails or guides for an arcuate gate member 14. The gate member 14 is slightly shorter than the periphery of the side walls and is provided at its rear end with an upwardly and forwardly turned roll 15 which forms a cocking or setting piece for the gate. The center of the roll 15 is cut out and turned downwardly as at 16 to form the catch hook 17 at the back of the gate. The rear end of the trigger rod 9 is provided with a latch hook 18 cooperative with the catch 17 to retain the gate in its backward, cocked position. Note that when the gate 14 is in cocked position the entrance aperture 7 is uncovered as is clearly illustrated in Fig. 1.

The bait hook 11 is formed of folded sheet metal, shaped to provide a notch 19 at the lower end thereof for receiving the laterally turned end of the trigger bar 19. The bait hook is also provided with a forward baffle plate 20 defining a series of apertures 21 through which the mouse can see and smell the bait indicated at 22 and which are small enough to prevent the mouse reaching the bait. The forward baffle plate 20 is of such size as to substantially close the space between the side walls 3 and base 2 so that a mouse cannot work his way past the baffle to get to the bait.

Near its upper edge the baffle 20 is provided with laterally projecting ears 23 which are journalled in the holes 24 formed in the side walls 3. The baffle 20 extends slightly above the axis of the ears 23 and defines an aperture 25 for receiving the hooked forward end of the spring 26. The rear end of the spring 26 is engaged with the apertured boss 27 struck inwardly from the gate 14 just forwardly of the roll 15.

Figure 1:
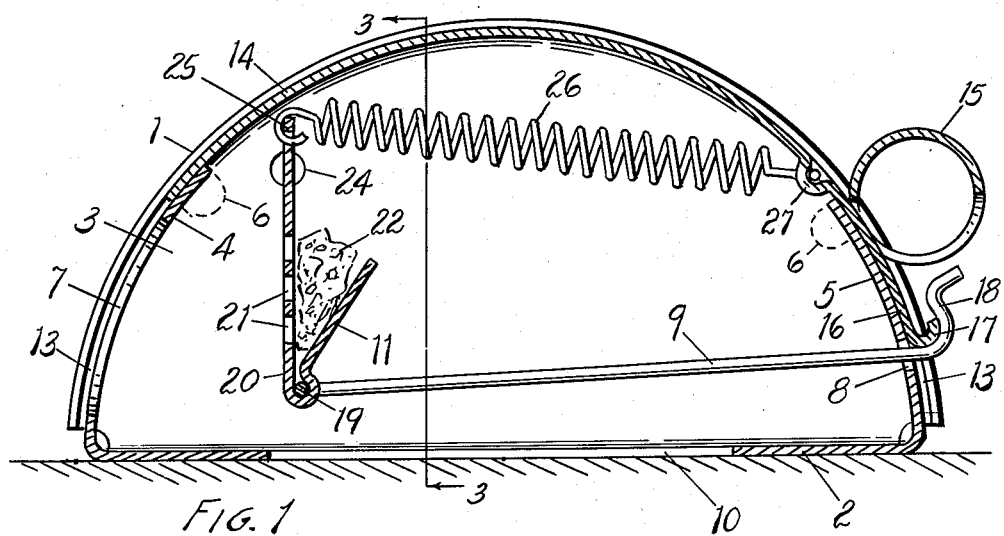
Fig. 1 is a vertical cross sectional view through the trap and taken along the line 1—1 in Fig. 3.

From the foregoing description it will be apparent that with the gate and trigger bar in the cocked and latched position illustrated in Fig. 1 the spring 26 will exert a rotative force on the baffle 20 tending to move the baffle 20 and trigger bar 9 forwardly. This force is relatively small in as much as the aperture 25 and point of engagement between the spring and baffle is spaced only slightly above the axis of the ears 23. The force on the baffle 20 is, however, strong enough to maintain the latch hook 18 in engagement with the hook 17 on the gate. At the same time, the entire strength of the spring 26 is exerted on the boss 27 and acts almost tangentially on the gate to urge the gate forwardly.

In operation of our trap the mouse senses the bait and enters through the opening 7 to encounter the baffle 20. In attempting to get at the protected bait the mouse will push backwardly on the bait hook and bar 9 and disengage the latch mechanism. The gate will then slide forwardly under the influence of the spring 26 to strike and kill the mouse as illustrated in Fig. 2. To reset the trap the user has only to slide the gate backwardly by grasping the sides of the body and the roll 15. The trap may be baited through the bottom aperture 10 and on no occasion will it be necessary to touch the trap around the entrance opening 7 and the front of the baffle 20.

We have thus described a highly practical embodiment of our trap but it should be understood that we do not intend to limit ourselves to the particular structure shown. Obviously the return fold 12 along the edges of the side walls 3 could be formed in the side edges of the gate 14 to engage an outwardly or inwardly turned flange along the side walls. Similarly the elements of the trap could be formed of other materials such as molded plastic. If desired the position of the baffle plate and bait hook can be moved inwardly until there is enough room inside the body to trap animals alive.

Having thus described our invention, what we claim as new and desire to secure by Letters Patent is:

1. In a mouse trap, a body member having a base with arcuate side walls turned upwardly from the side edges thereof, said base defining an aperture, end walls on said base curving upwardly within said side walls and secured thereto by means of ears folded through openings in said side wall, one of said end walls defining an entrance aperture, the other of said end walls defining a trigger bar receiving aperture, a perforate baffle plate having ears on the sides thereof received in holes in said side walls to pivotally support said baffle plate and having a hook on the rear face thereof adapted to receive a piece of bait, a trigger bar extending from said hook through said other end wall and having a latch hook on the rear end thereof, an arcuate gate member having a sliding tongue and groove engagement with channel folds on the edges of said side walls, a catch hook on the rear of said gate cooperative with said latch hook, a finger piece on the rear of said gate for cocking said trap, said catch hook and finger piece being bent from the arcuate portion of said gate, and a spring connected to the rear of said gate and extending forwardly within said body and engaging the top of said baffle plate slightly above the pivotal connection between said baffle plate and side plates.

2. In a mouse trap, a body member having a base with arcuate side walls turned upwardly from the side edges thereof, said base defining an aperture, end walls on said base curving upwardly within said side walls and secured thereto, one of said end walls defining an entrance aperture, the other of said end walls defining a trigger bar receiving aperture, a perforate baffle plate having ears on the sides thereof received in holes in said side walls to pivotally support said baffle plate and having a hook on the rear face thereof adapted to receive a piece of bait, a trigger bar extending from said hook through said other end wall and having a latch hook on the rear end thereof, an arcuate gate member having a sliding tongue and groove engagement with the edges of said side walls, a catch hook on the rear of said gate cooperative with said latch hook, a finger piece on the rear of said gate for cocking said trap, and a spring connected to the rear of said gate and extending forwardly within said body and engaging the top of said baffle plate slightly above the pivotal connection between said baffle plate and side plates.

3. In a mouse trap, a body member having a base with arcuate side walls turned upwardly from the side edges thereof, said base defining an aperture, end walls on said base curving upwardly within said side walls and secured thereto, one of said end walls defining an entrance aperture, a perforate baffle plate pivotally supported between said side walls and having a hook on the rear face thereof adapted to receive a piece of bait, said hook being positioned over said aperture in said base and being accessible therethrough, a trigger bar extending from said baffle plate through said other end wall and having a latch hook on the rear end thereof, an arcuate gate member having a sliding tongue and groove engagement with the edges of said side walls, a catch hook on the rear of said gate cooperative with said latch hook, a finger piece on the rear of said gate for cocking said trap, and a spring connected to the rear of said gate and extending forwardly within said body and engaging the top of said baffle plate slightly above the pivotal connection between said baffle plate and side plates.

4. In a mouse trap, a body member having a base with side walls turned upwardly from the side edges thereof, said base defining an aperture, end walls on said base curving upwardly within said side walls, one of said end walls defining an entrance aperture, a perforate baffle plate pivotally supported between said side walls and having a hook on the rear face thereof adapted to receive a piece of bait, said hook being positioned over said aperture in said base and being accessible therethrough, a trigger bar extending from said baffle plate through said other end wall and having a latch hook on the rear end thereof, an arcuate gate member having an arcuate sliding engagement with said side walls, a catch hook on the rear of said gate cooperative with said latch hook, a finger piece on said gate for cocking said trap, and a spring connected to said gate and extending forwardly within said body and engaging the top of said baffle plate slightly above the pivotal connection between said baffle plate and side plates.

5. In a trap, a body member having a base with side walls extending upwardly from the side edges thereof, end walls on said base curving upwardly within said side walls, one of said end walls defining an entrance aperture, a baffle plate pivotally supported between said side walls and having a hook on the rear face thereof adapted to receive a piece of bait, said baffle plate blocking the passage of a trapped animal to the rear of said body, a trigger bar extending from said baffle plate to the rear of said trap and having a latch on the rear end thereof, an arcuate gate member having a sliding tongue and groove engagement with the edges of said side walls, a hook catch on the rear of said gate cooperative with said latch hook, a finger piece on the rear of said gate for cocking said trap, and a spring connected to said gate and extending forwardly within said body and having an engagement with the top of said baffle plate slightly above the pivotal connection between said baffle plate and side plates.

6. In a trap, a body member having a base with side walls extending upwardly from the side edges thereof, end walls on said base curving upwardly within said side walls, one of said end walls defining an entrance aperture, a baffle plate pivotally supported between said side walls and having a hook on the rear face thereof adapted to receive a piece of bait, said baffle plate blocking the passage of a trapped animal to the rear of said body, a trigger bar extending from said baffle plate to the rear of said trap and having a latch on the rear end thereof, an arcuate gate member having a sliding tongue and groove engagement with the edges of said side walls, a hook catch on the rear of said gate cooperative with said latch hook, and a spring connected to said gate and extending forwardly within said body and having an engagement with the top of said baffle plate slightly above the pivotal connection between said baffle plate and side plates.

7. In a trap, a body member having a base with side walls extending upwardly from the side edges thereof, an end wall on said base curving upwardly within said side walls, a baffle plate pivotally supported between said side walls and having a hook on the rear face thereof adapted to receive a piece of bait, said baffle plate blocking the passage of a trapped animal to the rear of said body, a trigger bar extending from said baffle plate to the rear of said trap and having a latch on the rear end thereof, an arcuate gate member having a sliding engagement with said side walls, a catch on the rear of said gate cooperative with said latch, and a spring connected to said gate and extending forwardly within said body and having an engagement with the top of said baffle plate slightly above the pivotal connection between said baffle plate and side plates.

8. In a trap, the combination of a chambered body member provided with side walls having curved slide ways therein, the end walls being curved to correspond to the curvature of the said ways, one of the end walls having an entrance opening therein, a curved jaw member slidably mounted in said ways and telescopically associated with said end walls, a combined trip and bait holder member pivoted within said body member in spaced relation to said entrance opening, a trigger connected to the swinging end of said trip member and slidably supported in the other wall for detachable engagement with said jaw member, and a spring connected to said trip member and to said jaw member, and acting to urge said trigger to jaw engaging position and to actuate the jaw member across the said entrance opening when the trigger is disengaged.

9. In a trap, the combination of a chambered body member provided with side walls, one of the end walls having an entrance opening therein, a curved jaw member slidably mounted in said side walls and telescopically associated with said end walls, a combined trip and bait holder member pivoted within said body member in spaced relation to said entrance opening, a trigger connected to the swinging end of said trip member and slidably supported in the other end wall for detachable engagement with said jaw member, and a spring connected to said trip member and to said jaw member, and acting to urge said trigger to jaw engaging position and to actuate the jaw member across the said entrance opening when the trigger is disengaged.

10. In a trap, the combination of a chambered body comprising opposed walls, one of which has an entrance opening therein, an arcuate jaw member slidably mounted on said body member with its ends telescopically associated with said opposed walls, a trigger slidably supported in the wall opposite said wall having the entrance opening, a swingably mounted combined bait and trip holder to which said trigger is connected, and a common spring means for actuating said jaw member and holding said trigger in set position.

11. In a trap, the combination of a chambered body comprising opposed walls, one of which has an entrance opening therein, an arcuate jaw member slidably mounted on said body member with its ends telescopically associated with said opposed walls, a trigger slidably supported in the wall opposite said wall having the entrance opening, a swingably mounted combined bait and trip holder to which said trigger is connected, and means for actuating said jaw member and holding said trigger in set position.

12. In a trap, the combination of a chambered body member provided with an entrance opening, an arcuate jaw member slidably mounted on said body for longitudinal reciprocatory movement, a slidably mounted trigger for holding said jaw in set position, a swingably mounted combined trip and bait holder to which the trigger is connected, and a spring connected to said trip member and to said jaw member to actuate the jaw member across said entrance opening when the trigger is released, the jaw member when in set position permitting access through said entrance opening to said trip member within the chambered body.

13. In a trap, the combination of a chambered body member provided with an entrance opening, a plate-like jaw member slidably mounted on said body for longitudinal reciprocatory movement and constituting a top for the body, a trigger for holding said jaw member in retracted set position, a trip member to which said trigger is connected, and a spring connected to said trip member and to said jaw member to actuate the jaw member across said entrance opening when the trigger is released and acting to urge the trigger to jaw engaging position, the jaw member when in set position permitting access through said entrance opening to said trigger within the chambered body.

14. In a trap, the combination of a chambered body, a jaw member slidably mounted on said body, a trigger for holding said jaw member in set position, spring means for actuating said jaw member and releasably holding said trigger in set position common to both, and a trigger trip member mounted within said body member below said jaw member, said jaw member constituting a top for said chambered body member.

ALBERT PRICE.
MERLE K. BENSON.

REFERENCES CITED

The following references are of record in the file of this patent:

UNITED STATES PATENTS

| Number | Name | Date |
|---|---|---|
| 2,460,417 | Goostrey | Feb. 1, 1949 |